US006985250B2

(12) United States Patent
Folkins

(10) Patent No.: US 6,985,250 B2
(45) Date of Patent: Jan. 10, 2006

(54) ALTERNATE IMAGING MODE FOR MULTIPASS DIRECT MARKING

(75) Inventor: Jeffrey J. Folkins, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 763 days.

(21) Appl. No.: 10/040,691

(22) Filed: Jan. 7, 2002

(65) Prior Publication Data

US 2003/0128385 A1 Jul. 10, 2003

(51) Int. Cl.
*G06F 15/00* (2006.01)

(52) U.S. Cl. .................. 358/1.18; 358/1.15; 358/1.12; 347/14; 347/19

(58) Field of Classification Search .................. 347/14, 347/19; 399/394, 266; 101/222; 358/1.18, 358/1.15, 1.12
See application file for complete search history.

(56) References Cited

U.S. PATENT DOCUMENTS 5,095,342 A 3/1992 Farrell et al.
6,009,296 A * 12/1999 Nishimura .................. 399/266
6,050,191 A * 4/2000 Enderle et al. ............. 101/222
6,125,258 A * 9/2000 Umetani et al. ............ 399/394
6,565,192 B1 * 5/2003 Vinals et al. ................. 347/41
6,604,804 B2 * 8/2003 Asawaka ..................... 347/14

* cited by examiner

*Primary Examiner*—Kimberly Williams
*Assistant Examiner*—Satwant Singh
(74) *Attorney, Agent, or Firm*—Fay, Sharpe, Fagan, Minnich & McKee, LLP

(57) ABSTRACT

An "alternate imaging mode" is provided for processing print jobs during multipitch, multipass marking operations of a print system that transfers the composite full page images to sheets of a target substrate The method comprises the steps of a) beginning the marking of a first page image by a marking material applicator on a first pitch area of an intermediate substrate during a first revolution of the intermediate substrate; and b) beginning the marking of subsequent page images by the applicator on available pitch areas of the intermediate substrate during subsequent revolutions of the intermediate substrate, such marking being delayed from the marking of the prior page image so that the marking of two or more page images are not completed during the same revolution of the intermediate substrate

20 Claims, 7 Drawing Sheets

ALTERNATE IMAGING MODE FOR MULTIPASS DIRECT MARKING

BACKGROUND OF THE INVENTION

The present invention relates to an "alternate imaging mode" for processing print jobs. It finds particular application in conjunction with multipitch, multipass marking architectures that accumulate composite page images on an intermediate substrate and subsequently transfer the full page image to a target substrate, and will be described with particular reference thereto. However, it is to be appreciated that the present invention is also amenable to other like applications The terminology "copiers," and "copies," as well as "printers" and "prints," is used alternatively herein The terminology "imaging" and "marking" is used alternatively herein and refers to the entire process of putting an image, film a digital or analog source, onto a target substrate (e.g., paper). The image can then be permanently fixed to the target substrate by fusing, drying, or other means. It will be appreciated that the invention applies to multipass, multipitch marking architectures in any type of digital print system, including, but not limited to systems in the fields of incremental printing of symbolic information, photocopying, facsimile, and electrophotography. Digital print systems are also referred to by many technical and commercial names within these fields, including: electrophotographic (e.g., xerographic) printers, copiers, and multifunction peripherals; digital presses; laser printers; and ink-jet printers Digital print systems include paths through which sheets of a target substrate that are to receive an image are conveyed and imaged (ie., the paper path) The process of inserting sheets of the target substrate into the paper path and controlling the movement of the sheets through the paper path to receive an image is referred to as "scheduling"

One type of a multipass marking architecture is used to accumulate composite page images from multiple color separations. On each pass of the intermediate substrate, marking material for one of the color separations is deposited on the surface of the intermediate substrate until the last color separations is deposited to complete the composite image. Another type of multipass marking architecture is used to accumulate composite page images from multiple swaths of a print head On each pass of the intermediate substrate, marking material for one of the swaths is applied to the surface of the intermediate substrate until the last swath is applied to complete the composite image Both of these examples of multipass marking architectures perform what is commonly known as "page printing" once the composite page image is completed by transferring the full page image from the intermediate substrate to the target substrate.

Multipass printing may be scheduled in what may be referred to as "burst mode." When scheduling in "burst mode," sheets are inserted into, imaged, and output from the paper path at the maximum throughout capacity of the print system without any "skipped pitches" or delays between each consecutive sheet A "pitch" is the portion (or length) of the paper path in the process direction which is occupied by a sheet of the target substrate as it moves through the paper path. A "skipped pitch" occurs when there is a space between two consecutively output sheets which is long enough to hold another sheet. Various methods for scheduling in "burst mode" are disclosed in U.S. Pat. No. 5,095,342 to Farrell et al. and other patents. However, these patents are directed toward scheduling problems regarding duplex printing and integration of print engines with finishing devices, rather than the problems described herein and others which the present invention overcomes In a multipitch marking architecture, the surface of the intermediate substrate (e.g., intermediate transfer drum or belt) is partitioned into multiple segments, each segment including a full page image (i.e., a single pitch) and an inter-document zone For example, a two pitch drum is capable of printing two pages during a pass or revolution of the drum. Likewise, a three pitch belt is capable of printing three pages during a pass or revolution of the belt In a multipitch, multipass marking architecture, traditional "burst mode" scheduling starts accumulating images for each pitch of the intermediate substrate at the beginning of a print job and on the final pass of the multipass cycle each composite image is transferred to a target substrate However, problems can arise when attempting to transfer multiple composite images from the intermediate substrate (e.g., intermediate transfer drum or belt) to the target substrate (e.g., paper) during the same pass These problems are primarily associated with integration of the intermediate substrate/transfer station with adjacent stations (e.g., preheating or other type of pre-conditioning stations and fusing stations) in the paper path. This is particularly a problem in a high-speed print system. For example: i) preceding stations (e.g, preheating or pre-conditioning stations) may not be able to operate properly if the target substrate is advanced at the same speed as in the transfer station, ii) likewise, successive stations (e.g., fusing stations) may not be able to receive the transferred sheets as fast as the transfer station can output them, iii) alternatively, to make the adjacent stations capable of such operation they may become unacceptably large and/or economically cost prohibitive. Furthermore, registration of sheets in the paper path to the composite page images on the intermediate substrate may not be sufficiently reliable if it is performed at the same speed as sheets advancing through the transfer station.

Accordingly, there is a need for an alternative to traditional "burst mode" scheduling for multipitch, multipass marking architectures that accumulate full page images on an intermediate substrate. The present invention contemplates an "alternate imaging mode" that overcomes the above-referenced problems and others.

SUMMARY OF THE INVENTION

In accordance with one aspect of the present invention, a method for scheduling print operations in a print system is provided The method comprises the steps of: a) partitioning an intermediate substrate into multiple pitch areas, b) scheduling the marking of multiple page images by a marking material applicator on the multiple pitch areas, the marking of each page image being accumulated and completed during multiple passes of an assigned pitch area past the applicator; c) beginning the marking of a first page image on a first pitch area during a first revolution of the intermediate substrate; and d) beginning the marking of subsequent page images on available pitch areas during subsequent revolutions of the intermediate substrate, such marking being delayed from the marking of the prior page image so that the marking of two or more page images are not completed during the same revolution of said intermediate substrate.

In accordance with another aspect of the present invention, a method for scheduling multipass, multipitch print operations in a print system is provided The method comprises the steps of: a) beginning the marking of a first page image by a marking material applicator on a first pitch area of an intermediate substrate during a first revolution of the intermediate substrate; and b) beginning the marking of subsequent page images by the applicator on available pitch areas of the intermediate substrate during subsequent revolutions of the intermediate substrate, such marking being delayed from the marking of the prior page image so that the marking of two or more page images are not completed during the same revolution of the intermediate substrate.

In accordance with another aspect of the present invention, a print system for processing print jobs is provided The print system comprises an intermediate substrate for receiving marking materials, being selectively partitionable into multiple pitch areas, a marking material applicator disposed to selectively apply marking material to the pitch areas on the intermediate substrate, and a controller operationally coupled to said intermediate substrate and said applicator for controlling said intermediate substrate and for scheduling the application of marking material by said applicator, wherein the controlling includes partitioning the intermediate substrate into multiple pitch areas and wherein the scheduling includes: a) scheduling the marking of multiple page images by said applicator on the multiple pitch areas, the marking of each page image being accumulated and completed during multiple passes of an assigned pitch area past said applicator, b) beginning the marking of a first page image on a first pitch area during a first revolution of said intermediate substrate, and c) beginning the marking of subsequent page images on available pitch areas of the intermediate substrate during subsequent revolutions of the intermediate substrate, such marking being delayed from the marking of the prior page image so that the marking of two or more page images are not completed during the same revolution of said intermediate substrate In accordance with another aspect of the present invention, a print system for processing print jobs using a multipitch, multipass architecture is provided The print system comprises: an intermediate substrate for receiving marking materials, a marking material applicator disposed to selectively apply marking material on the intermediate substrate, and a controller operationally coupled to said applicator for scheduling the application of marking material by said applicator, wherein the scheduling includes: a) beginning the marking of a first page image on a first pitch area during a first revolution of said intermediate substrate and b) beginning the marking of subsequent page images by said applicator on available pitch areas of the intermediate substrate during subsequent revolutions of the intermediate substrate, such marking being delayed from the marking of the prior page image so that the marking of two or more page images are not completed during the same revolution of said intermediate substrate

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention

DETAILED DESCRIPTION OF THE PREFERRED EMBODIMENTS

Figure 1:
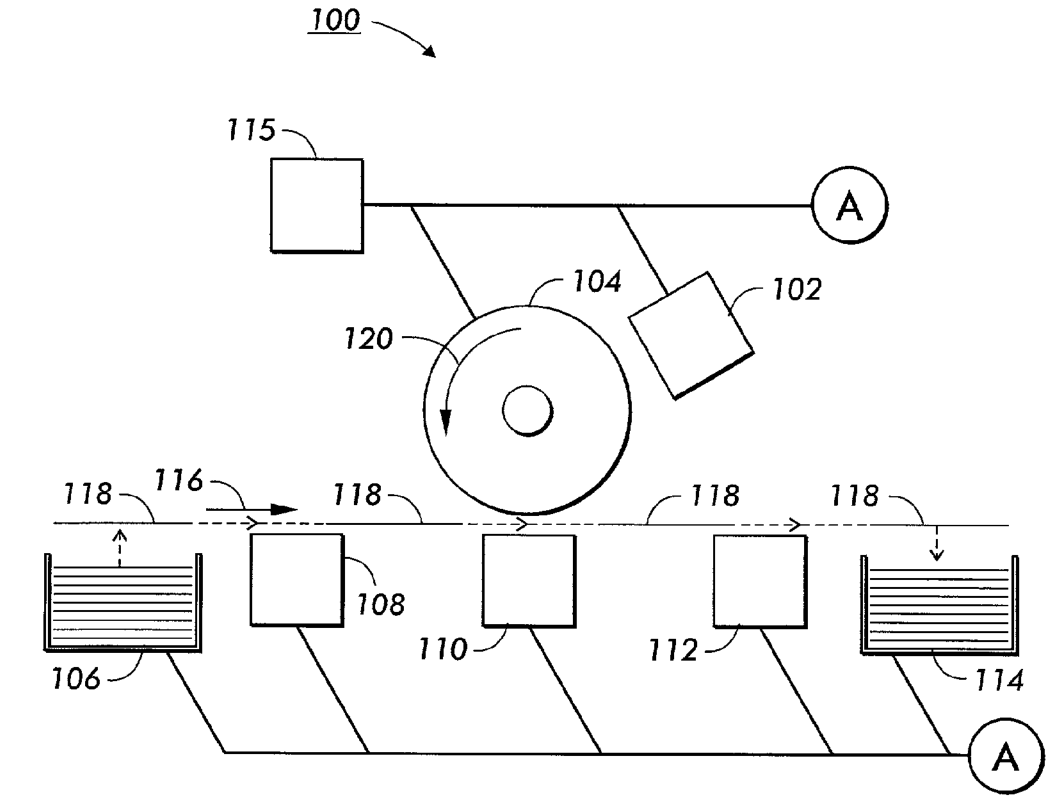
FIG. 1 is a diagram of the typical marking material and paper handling components of a print system related to the present invention.

With reference to FIG. 1, the typical marking material and paper handling components of a print system 100 related to the present invention are shown More specifically, a marking material applicator 102, an intermediate substrate 104, a feeding bin 106, a pre-conditioning station 108, a transfer station 110, a fusing station 112, a collection bin 114, and a controller 115 are shown. The paper path 116 shows sheets of target substrate 118 advancing from the feeding bin 106, through the pre-conditioning station 108, transfer station 110, and fusing station 112 to the collection bin 114. The controller 115 is operationally coupled to each station along the paper path 116 and controls advancement of the target substrate from the feeding bin 106 through each station (108–112) to the collection bin 114. Likewise, the controller 115 is also operationally coupled to the intermediate substrate 104 and marking material applicator 102 The controller 115 controls movement of the intermediate substrate 104 in a process direction 120 during the processing of a print job The marking material applicator 102, under control of the controller 115, deposits marking material on the intermediate substrate 104 as the intermediate substrate 104 moves in the process direction 120 The marking material deposited on the intermediate substrate 104 is based on image processing of the page to be printed. Advancement of the target substrate 118 is coordinated with movement of the intermediate substrate 104 by the controller 115 so that the page image (ie, the deposited marking material) and a target substrate sheet 118 meet at the transfer station 110 The marking material is transferred from the intermediate substrate 104 to the target substrate 118 at the transfer station 110 The target substrate sheet 118 continues advancing to the fusing station 112. At the fusing station 112, the marking material is permanently affixed to the target substrate sheet 118, the target substrate sheet 118 continues advancing to the collection bin 114

The print system 100 is preferably an ink-jet printer based on ink marking technology. Alternatively, the print system 100 can be a xerographic printer based on toner marking technology or another type of printer based on marking technology similar to toner or ink marking. The marking material applicator 102 is preferably a print head based on solid ink and piezoelectric technologies Alternatively, the print head can be based on other ink marking technologies capable of performing the desired function in a similar manner In still another alternative, in the color REaD (Recharge, Expose and Development)-type xerographic printer system, the marking material applicator 102 can be a charging, image exposure, and developer station or another assembly capable of performing the desired function in a similar manner In this case the intermediate substrate is a photoconductive medium. In still another alternative, in the color tandem-type xerographic printer system, the marking material applicator 102 can be a charging, image exposure, development station with a rotating photoconductive substrate that transfers marking materials onto the intermediate substrate 104 Additional alternatives that incorporate multiple marking material applicators 102 are also contemplated. The intermediate substrate 104 is preferably a rotating drum Alternatively, the intermediate substrate 104 can be a moving belt or another assembly capable of performing the desired function in a similar manner to the drum or belt The pre-conditioning station 108 is preferably a preheater for heating the target substrate 118 to a predetermined temperature prior to transferring the marking material from the intermediate substrate 104 to the target substrate 118 Alternatively, the pre-conditioning station 108 can be another type of conditioning station used in conjunction with ink or toner marking technologies. For example, in toner marking technology, a charging station may be used to apply a predetermined electrical charge to the target substrate 118 prior to transferring toner from the intermediate substrate 104

Figure 2:
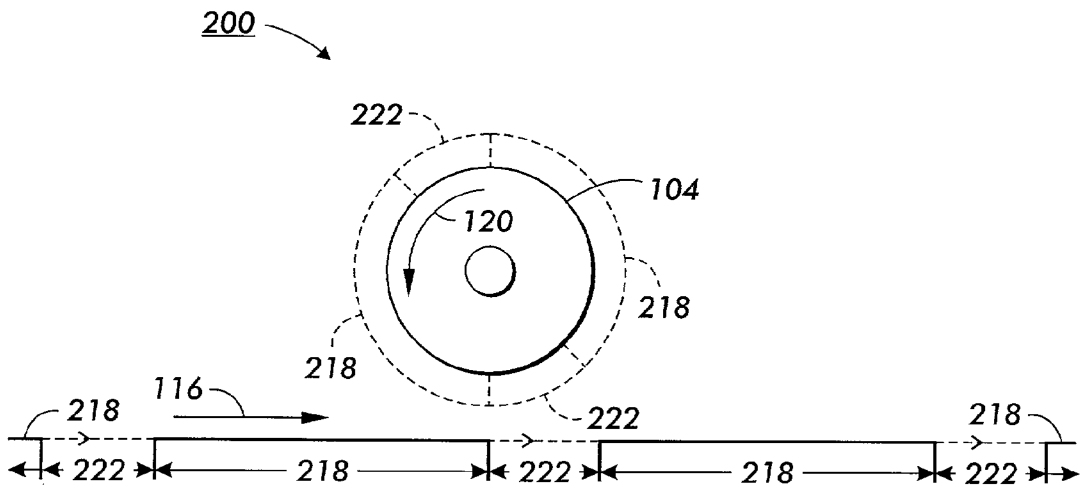
FIG. 2 is a diagram of pitches on the intermediate substrate and along the paper path of FIG. 1.

With reference to FIG. 2, shown are pitches 218 on the intermediate substrate 104 and along the paper path 116 of FIG. 1 A pitch 218 is the dimension of the target substrate 118 in the process direction 120 The print system 200 implements two-pitch marking architecture using the marking material and paper handling components of FIG. 1 Alternatively, the print system 200 can be comprised of other components capable of implementing the two-pitch marking architecture.

The intermediate substrate 104 must be of a sufficient circumference or other exterior dimension to permit two-pitch printing of the desired target substrate 118 Knowing the dimensions of the surface of the intermediate substrate 104 and the dimensions of the target substrate 118, the controller partitions the surface into four areas two pitch areas 218 and two inter-document areas 222 The two pitch areas 218 are based on the dimension of target substrate 118 in the process direction 120 While the two inter-document areas 222 are based on the remaining area on the surface of the intermediate substrate 104. For example, a drum with a circumference of 565.5 mm (22.25 in) can implement two-pitch printing of standard "A-size" (215.9 mm (8.5 in.) by 279.4 mm (11 in.)) paper. In doing so, the drum is partitioned into two pitch areas 218 of 215.9 mm (8.5 in ) and two inter-document areas 222 of 66.85 mm (2.625 in) Variations of multipitch marking (eg, three-pitch, four-pitch, etc) may be implemented when the size of the target substrate 118 is reduced or if the size of the intermediate substrate 104 is increased.

Similar to partitioning the intermediate substrate 104, the controller 115 also divides the paper path 116 into pitch areas 218 and inter-document areas 222 However, the dimensions of any given pitch area 218 and inter-document area 222 in the paper path 116 is based on the speed at which the target substrate 118 is advanced through that portion of the paper path 116 If the target substrate 118 is advanced at the same speed as the surface of the intermediate substrate 104, the pitch area 218 and the inter-document area 222 in the paper path is the same dimension as those on the surface of the intermediate substrate 104. However, if the target substrate 118 is advanced more slowly, the pitch area 218 and the inter-document area 222 in the paper path are larger than those on the surface of the intermediate substrate 104

Figure 3:
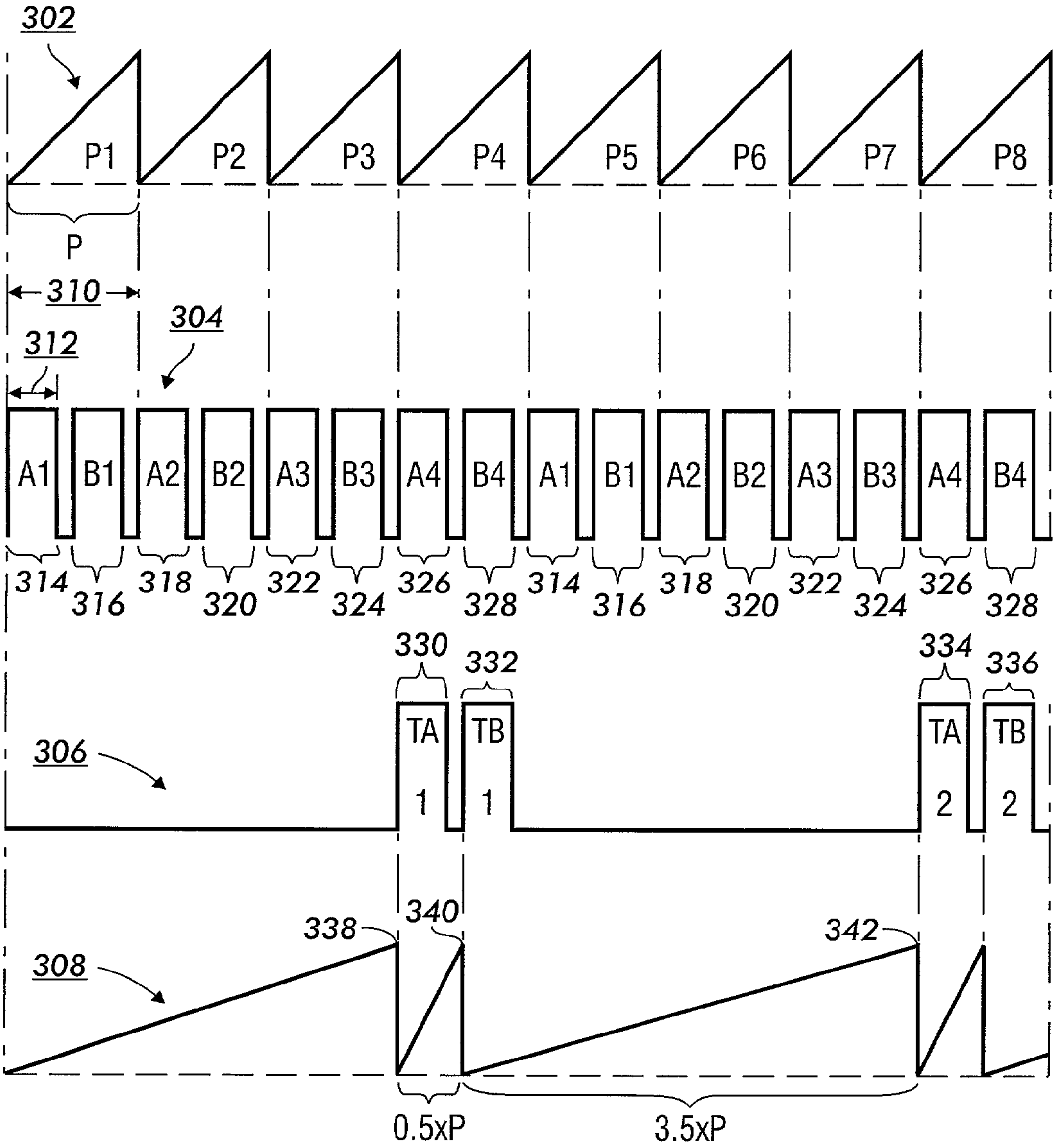
FIG. 3 is a timing diagram for a two-pitch, four-pass pass marking architecture that schedules print jobs in "burst mode,"

With reference to FIG. 3, a timing diagram for a two-pitch, four-pass marking architecture that schedules print jobs in "burst mode" is shown More specifically, FIG. 3 includes a periodic sawtooth waveform 302, a square pulse train 304, a repeating dual square pulse sequence 306, and a repeating dual sawtooth pulse sequence 308 The periodic sawtooth waveform 302 represents passes (ie, revolutions) of the intermediate substrate 104. The square pulse train 304 represents activation of the marking material applicator 102 by the controller 115 The repeating dual square pulse sequence 306 represents activation of the transfer station 110 by the controller 115. The repeating dual sawtooth pulse sequence 308 represents target substrate 118 demand at the transfer station 110

The intermediate substrate 104 begins moving in the process direction 120 at the beginning of a print job in order to begin imaging the first page Each cycle of the sawtooth waveform ("P") 310 represents a revolution or pass of the intermediate substrate 104. The diagram reflects eight passes (8P), numbered sequentially P1–P8. In actuality, the intermediate substrate 104 continues to move until the print job is complete A pass (P) is a useful reference for timing operations and will be used in the following discussion for relative and proportional comparisons (e.g., 0.5P, 3.5P)

Returning to FIGS. 1 and 2, the two-pitch, four-pass marking architecture is based on requiring four passes of the marking material applicator 102 over each of the pitch areas 218 to completely mark the composite image The four passes can either apply four swaths or four color separations of the composite image. Where it is based on four swaths, the desired composite resolution and the resolution of each swath of the applicator 102 are considered. For example, if the desired resolution is 600 dots per inch (dpi), in the four-pass architecture the resolution of the marking material applicator 102 is 150 dpi. After each pass, the applicator 102 is moved in the X (i.e, cross-process) direction by the controller 115 and the resolution of the composite image is 600 dpi from the accumulation of the four 150 dpi swaths Alternatively, where the four passes apply four color separations, each color separation is applied in successive passes. For example, the applicator 102 may deposit cyan, magenta, yellow, and black color separations in successive passes. Other techniques that complete the composite image in four passes are also contemplated, including print systems with multiple marking material applicators 102.

With continued reference to FIG. 3, each pulse 312 in the square pulse train 304 represents activation of the marking material applicator 102 by the controller 115 In the two-pitch, four-pass marking architecture, the applicator 102 is activated twice during each pass P of the intermediate substrate 104, one activation for each pitch area 218. For clarity, the two pitch areas 218 on the intermediate substrate 104 are referred to as "pitch A" and "pitch B" in the following discussion Furthermore, it is assumed that the applicator 102 encounters pitch A and then pitch B during each pass P In other words, pitch A represents the first page and subsequent odd pages of a print job and pitch B represents the second page and subsequent even pages In "burst mode," the applicator 102 begins depositing marking material on both pitch A and pitch B during pass P1 This is reflected by applicator activation pulses A1 314 and B1 316. As first and second page imaging continues, pulses A2 318 and B2 320 represent activation of the applicator 102 during pass P2 Likewise, pulses A3 322 and B3 324 represent activation during pass P3 and pulses A4 326 and B4 328 represent activation during pass P4. After the fourth pass, the applicator 102 begins another identical four-pass cycle for the third and fourth pages of the print job The applicator 102 continues to be activated in like fashion until the print job is complete Each pulse (e.g, 330) in the dual square pulse sequence 306 represents activation of the transfer station 110 by the controller 115. After the start of A4 326, transfer of the pitch A composite image to a target substrate 118 can begin Accordingly, a target substrate sheet 118 advancing along the paper path 116 is coordinated to meet with the composite image as it reaches the transfer station 110 Transfer of the composite image is performed during transfer station activation pulse TA1 330 Note that the duration of pulse TA1 330 is substantially the same as an applicator activation pulse 312 because the target substrate 118 and the surface of the intermediate substrate 104 are moving at substantially the same speed during the transfer operation Also note, that in actuality the transfer station activation pulse TA1 330 lags the fourth applicator activation pulse A4. The amount of lag depends on the actual positions of the applicator 102 and the transfer station 110. For example, in the print system 100 of FIG. 1 the applicator 104 is shown at 2 o'clock and the transfer station 110 at 6 o'clock with respect to the intermediate substrate 104. This would result in an approximate delay of 0.67P from pulse A4 326 to pulse TA1 330. Each transfer station activation pulse would lag its corresponding fourth applicator application pulse in like fashion Nevertheless, the present invention is not effected by the delay Likewise, after the start of B4 328, transfer of the pitch B composite image to a target substrate 118 can begin. Accordingly, a second target substrate sheet 118 advancing along the paper path 116 is coordinated to meet the composite image as it reaches the transfer station 110. Transfer of the composite image is performed during the transfer station activation pulse TB1 332 Presuming the print job includes third and fourth pages, the transfer station is activated again in identical fashion after the start of A4 326 and B4 328 in pass P8 Transfer station activation for the third and fourth page images are represented by pulses TA2 334 and TB2 336, respectively Each pulse (e.g., 338) in the dual sawtooth pulse sequence 308 represents target substrate 118 demand at the transfer station 110. In "burst mode," it is important to note that the second target substrate sheet 118 is demanded approximately 0.5P revolutions of the intermediate substrate 104 after the first target substrate sheet 118 was demanded This is reflected by sawtooth pulses 338 and 340, which align with the beginning of transfer station activation pulses TA1 330 and TB1 332, respectively. In contrast, the third target substrate sheet 118 is demanded approximately 3.5P revolutions after the second target substrate sheet 118. This is reflected by sawtooth pulses 340 and 342, which align with the beginning of transfer station activation pulses TB1 332 and TA 2 334, respectively. This pattern of odd numbered sheets demanded approximately 0.5P revolutions after even numbered sheets and even number sheets demanded approximately 3.5P revolutions after odd numbered sheets continues until the print job is complete The disparity between alternating demands of 0.5P and 3.5P revolutions of the intermediate substrate 104 is perhaps emphasized by the following example. If the intermediate substrate is a drum with a circumference of 565.5 mm (22.25 in) and the drum is rotated at 1400 mm/sec. (55 in./sec.), each pass (P) is 0.4 sec. in duration and the transfer station 110 alternates between demanding target substrate sheets 118 in 0.2 sec (0.5P) and 1.4 sec (3.5P).

Figure 4:
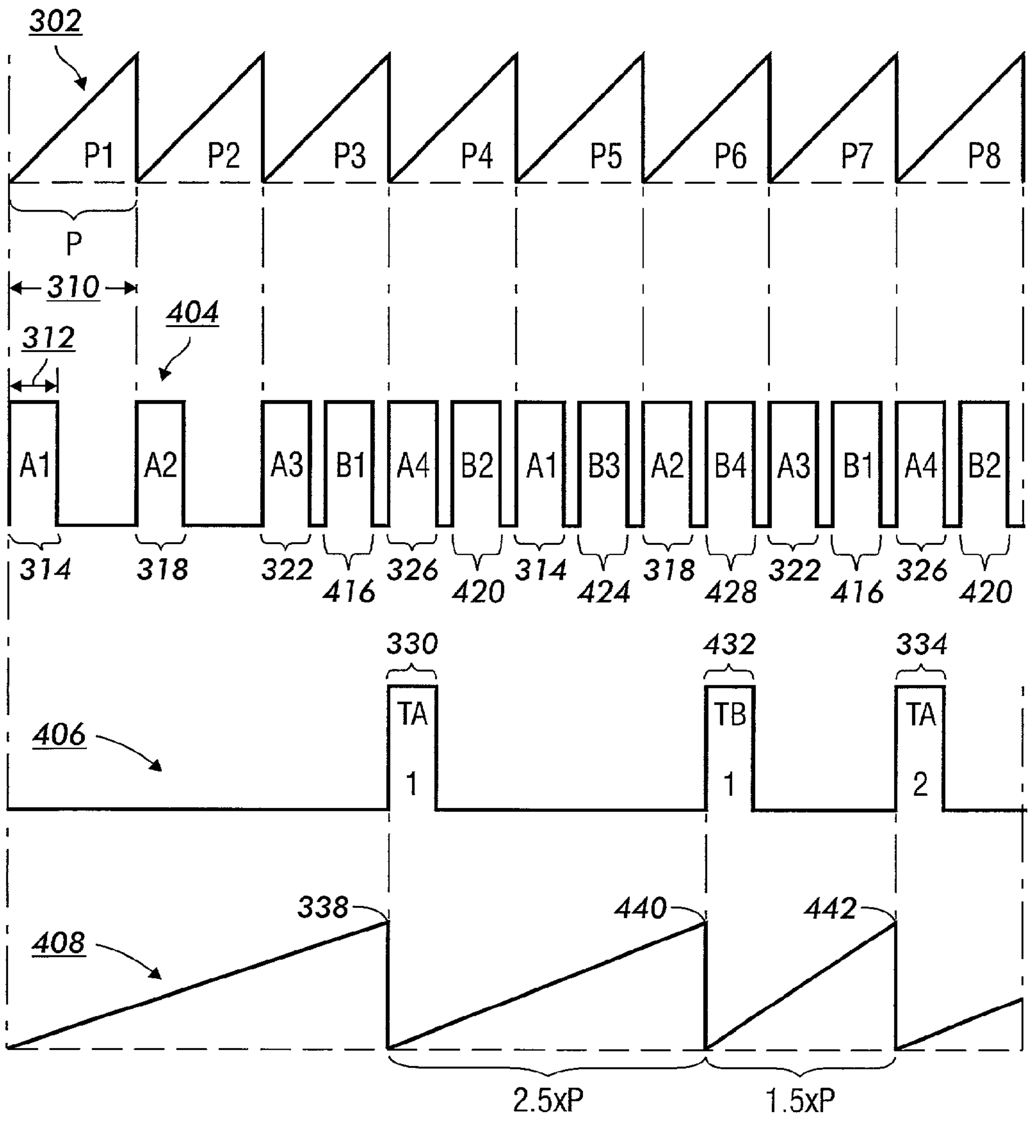
FIG. 4 is a timing diagram for a two-pitch, four-pass marking architecture that schedules print jobs in an "alternate imaging mode" in accordance with an embodiment of the present invention.

With reference to FIG. 4, a timing diagram for a two-pitch, four-pass marking architecture that schedules print jobs in an "alternate imaging mode" in accordance with an embodiment of the present invention is shown. Like FIG. 3, FIG. 4 includes a periodic sawtooth waveform 302, a square pulse train 404, a repeating dual square pulse sequence 406, and a repeating dual sawtooth pulse sequence 408 The diagrams (ie, 302, 404, 406, and 408) represent the same type of information as the diagrams of FIG. 3

The intermediate substrate 104 moves in the same manner for FIG. 4 as described for FIG. 3. Accordingly, the periodic sawtooth waveform 302 and a pass P 310 of the intermediate substrate 104 in FIG. 4 are identical to that of FIG. 3

As shown in FIG. 3, each pulse 312 in the square pulse train 404 of FIG. 4 represents activation of the marking material applicator 102 by the controller 115 Since FIG. 4, like FIG. 3, shows timing sequences for a two-pitch, four-pass marking architecture, the marking material applicator 102 is activated in basically the same manner as described in FIG. 3. Accordingly, FIG. 4 also refers to the two pitch areas 218 on the intermediate substrate 104 as "pitch A" and "pitch B." The distinction between FIG. 4 and FIG. 3 is that FIG. 4 employs "alternate imaging mode" rather than "burst mode" scheduling In this embodiment of "alternate imaging mode," the applicator 102 begins depositing marking material on pitch A during pass P1 and delays beginning pitch B imaging until pass P3. This is reflected by applicator activation pulses A1 314 during pass P1. During pass P2, first page imaging continues with pulse A2 318. During pass P3, first page imaging continues and the applicator 102 begins depositing marking material on pitch B This is reflected by pulses A3 322 and B1 416 During pass P4, first page and second page imaging continues with pulses A4 326 and B2 420 During pass P5, second page imaging continues on pitch B and the applicator 102 begins another identical four-pass cycle for the third page of the print job on pitch A. This is reflected by pulses B3 424 and A1 314. During pass P6, second and third page imaging continues with pulses B4 428 and A2 318. The applicator 102 continues to be activated in like fashion until the print job is complete Like in FIG. 3, each pulse (e.g., 330) in the dual square pulse sequence 406 of FIG. 4 represents activation of the transfer station 110 by the controller 115 After the start of A4 326, transfer of the pitch A composite image to a target substrate 118 can begin. Transfer of the pitch A composite image is performed the same in FIG. 4 as in FIG. 3. This is reflected by transfer station activation pulse TA1 330, which occurs at the same point in FIG. 4 as in FIG. 3 Transfer of the pitch B composite image to a target substrate 118 can begin after the start of B4 428. This is reflected by transfer station activation pulse TB1 432. However, note that in FIG. 4 the applicator activation pulse B4 begins during pass P6, rather than during pass P4 as it did in FIG. 3 Presuming the print job includes third and fourth pages, the transfer station is activated again in identical fashion after the start of A4 326 in pass P8 and after the start of the fourth marking pass over pitch B in pass P10 (not shown) Transfer station activation for the third page image is represented by pulse TA2 334

As shown in FIG. 3, each pulse (e.g., 338) in the dual sawtooth pulse sequence 408 in FIG. 4 represents target substrate 118 demand at the transfer station 110 In this embodiment of "alternate imaging mode," it is important to note that the second target substrate sheet 118 is demanded approximately 2.5P revolutions of the intermediate substrate 104 after the first target substrate sheet 118 was demanded This is reflected by sawtooth pulses 338 and 440, which align with the beginning of transfer station activation pulses TA1 330 and TB1 432, respectively Similarly, the third target substrate sheet 118 is demanded approximately 1.5P revolutions after the second target substrate sheet 118. This is reflected by sawtooth pulses 440 and 442, which align with the beginning of transfer station activation pulses TB1 432 and TA2 334, respectively This pattern of odd numbered sheets demanded approximately 2.5P revolutions after even numbered sheets and even number sheets demanded approximately 1.5P revolutions after odd numbered sheets continues until the print job is complete Where average demand would be 2P revolutions of the intermediate substrate 104, the alternating demands of 2.5P and 1.5P revolutions in FIG. 4 produces less deviation about the average than the alternating demands of 0.5P and 3.5P in FIG. 3 This is perhaps emphasized by applying the example of the drum with a circumference of 565.5 mm (22.25 in), rotated at 1400 mm/sec (55 in/sec) used above Recall that each pass (P) of the drum is 0.4 sec. in duration Also recall that under "burst mode" scheduling (FIG. 3) the transfer station 110 alternates between demanding target substrate sheets 118 in 0.2 sec. (0.5P) and 1.4 sec. (3.5P). Here, under the FIG. 4 embodiment of "alternate imaging mode" scheduling, the transfer station 110 alternates between demanding target substrate sheets 118 in 1.0 sec (2.5P) and 0.6 sec (1.5P)

Figure 5:
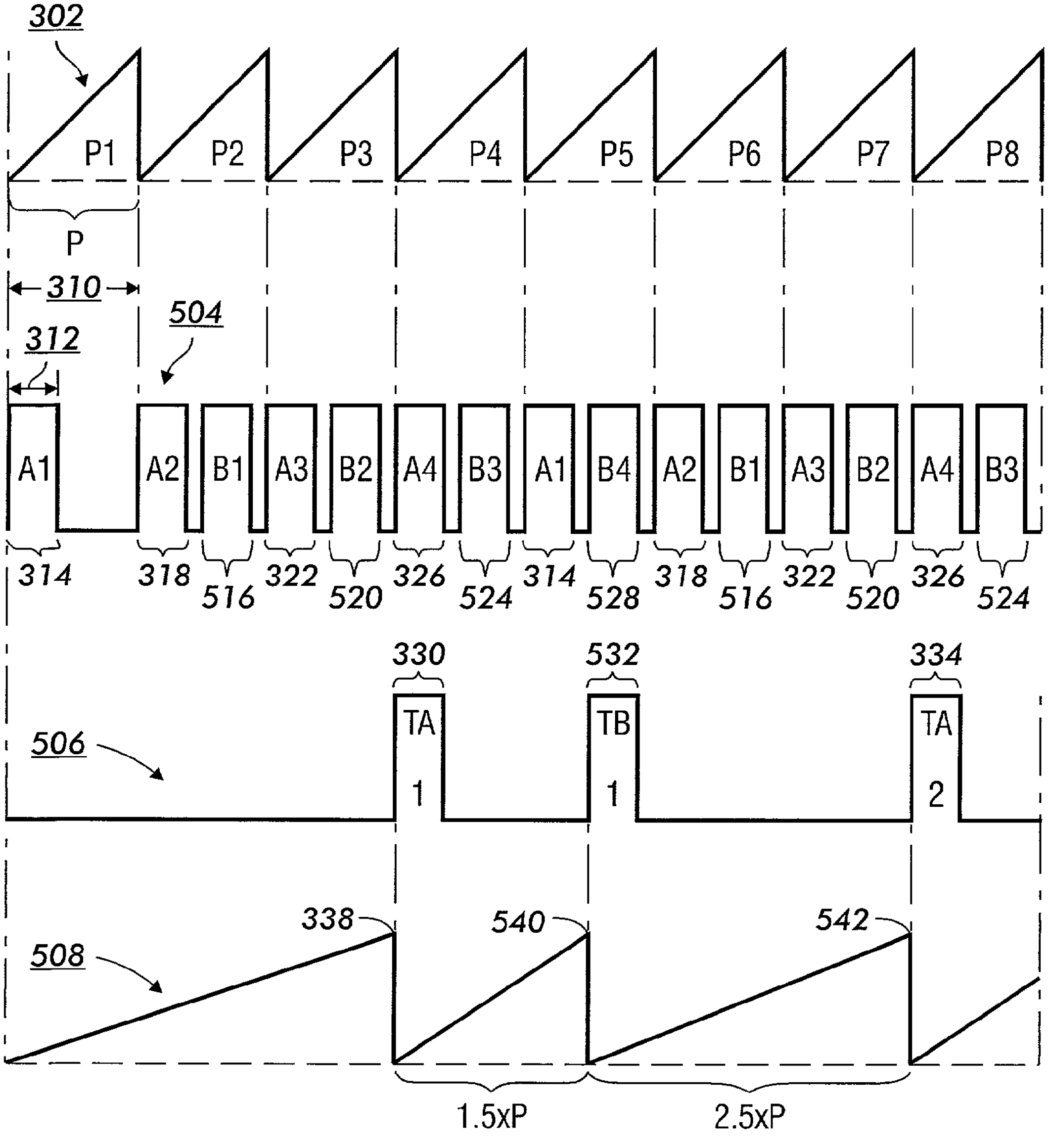
FIG. 5 is a timing diagram for a two-pitch, four-pass marking architecture that schedules print jobs in an "alternate imaging mode" in accordance with an embodiment of the present invention.

With reference to FIG. 5, a timing diagram for a two-pitch, four-pass marking architecture that schedules print jobs in an "alternate imaging mode" in accordance with an embodiment of the present invention is shown Like FIG. 3, FIG. 5 includes a periodic sawtooth waveform 302, a square pulse train 504, a repeating dual square pulse sequence 506, and a repeating dual sawtooth pulse sequence 508. The diagrams (ie., 302, 504, 506, and 508) represent the same type of information as the diagrams of FIG. 3

The intermediate substrate 104 moves in the same manner for FIG. 5 as described for FIG. 3 Accordingly, the periodic sawtooth waveform 302 and a pass P 310 of the intermediate substrate 104 in FIG. 5 are identical to that of FIG. 3.

As depicted in FIG. 3, each pulse 312 in the square pulse train 504 of FIG. 5 represents activation of the marking material applicator 102 by the controller 115 Since FIG. 5, like FIG. 3, shows timing sequences for a two-pitch, four-pass marking architecture, the marking material applicator 102 is activated in basically the same manner as described in FIG. 3. Accordingly, FIG. 5 also refers to the two pitch areas 218 on the intermediate substrate 104 as "pitch A" and "pitch B" The distinction between FIG. 5 and FIG. 3 is that FIG. 5 employs "alternate imaging mode" rather than "burst mode" scheduling.

In this embodiment of "alternate imaging mode," the applicator 102 begins depositing marking material on pitch A during pass P1 and delays beginning pitch B imaging until pass P2 This is reflected by applicator activation pulses A1 314 during pass P1. During pass P2, first page imaging continues and the applicator 102 begins depositing marking material on pitch B. This is reflected by pulses A2 318 and B1 516. During pass P3, first page and second page imaging continues with pulses A3 322 and B2 520 During pass P4, first page and second page imaging continues with pulses A4 326 and B3 524 During pass P5, second page imaging continues on pitch B and the applicator 102 begins another identical four-pass cycle for the third page of the print job on pitch A. This is reflected by pulses B4 528 and A1 314. The applicator 102 continues to be activated in like fashion until the print job is complete Like in FIG. 3, each pulse (e.g, 330) in the dual square pulse sequence 506 of FIG. 5 represents activation of the transfer station 110 by the controller 115 After the start of A4 326, transfer of the pitch A composite image to a target substrate 118 can begin. Transfer of the pitch A composite image is performed the same in FIG. 5 as in FIG. 3. This is reflected by transfer station activation pulse TA1 330, which occurs at the same point in FIG. 5 as in FIG. 3. Transfer of the pitch B composite image to a target substrate 118 can begin after the start of B4 528. This is reflected by transfer station activation pulse TB1 532. However, note that in FIG. 5 the applicator activation pulse B4 begins during pass P5, rather than during pass P4 as it did in FIG. 3 Presuming the print job includes third and fourth pages, the transfer station is activated again in identical fashion after the start of A4 326 in pass P8 and after the start of the fourth marking pass over pitch B in pass P9 (not shown). Transfer station activation for the third page image is represented by pulse TA2 334

As shown in FIG. 3 each pulse (eg, 338) in the dual sawtooth pulse sequence 508 in FIG. 5 represents target substrate 118 demand at the transfer station 110 In this embodiment of "alternate imaging mode," it is important to note that the second target substrate sheet 118 is demanded approximately 1.5P revolutions of the intermediate substrate 104 after the first target substrate sheet 118 was demanded. This is reflected by sawtooth pulses 338 and 540, which align with the beginning of transfer station activation pulses TA1 330 and TB1 532, respectively Similarly, the third target substrate sheet 118 is demanded approximately 2.5P revolutions after the second target substrate sheet 118 This is reflected by sawtooth pulses 540 and 542, which align with the beginning of transfer station activation pulses TB1 532 and TA2 334, respectively This pattern of odd numbered sheets demanded approximately 1.5P revolutions after even numbered sheets and even number sheets demanded approximately 2.5P revolutions after odd numbered sheets continues until the print job is complete Where average demand would be 2P revolutions of the intermediate substrate 104, the alternating demands of 1.5P and 2.5P revolutions in FIG. 5 produce less deviation about the average than the alternating demands of 0.5P and 3.5P in FIG. 3. This is perhaps emphasized by applying the example of the drum with a circumference of 565.5 mm (22.25 in.), rotated at 1400 mm/sec. (55 in./sec.) used above. Recall that each pass (P) of the drum is 0.4 sec. in duration. Also recall that under "burst mode" scheduling (FIG. 3) the transfer station 110 alternates between demanding target substrate sheets 118 in 0.2 sec. (0.5P) and 1.4 sec (3.5P) Here, under the FIG. 5 embodiment of "alternate imaging mode" scheduling, the transfer station 110 alternates between demanding target substrate sheets 118 in 0.6 sec. (1.5P) and 1.0 sec. (2.5P)

Figure 6:
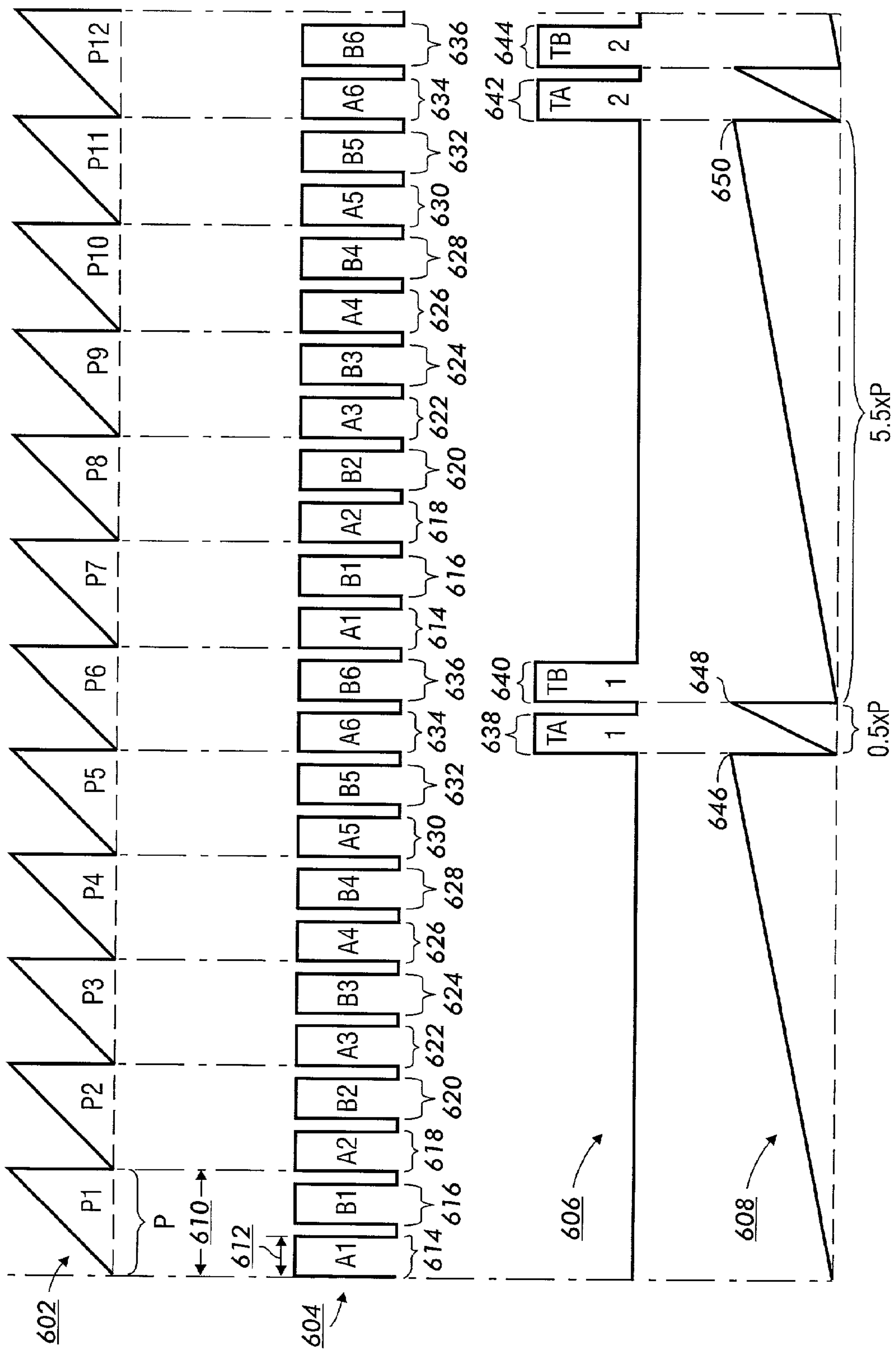
FIG. 6 is a timing diagram for a two-pitch, six-pass marking architecture that schedules print jobs in "burst mode,"

With reference to FIG. 6, a timing diagram for a two-pitch, six-pass marking architecture that schedules print jobs in "burst mode" is shown More specifically, FIG. 6 includes a periodic sawtooth waveform 602, a square pulse train 604, a repeating dual square pulse sequence 606, and a repeating dual sawtooth pulse sequence 608. The periodic sawtooth waveform 602 represents passes (ie., revolutions) of the intermediate substrate 104. The square pulse train 604 represents activation of the marking material applicator 102 by the controller 115. The repeating dual square pulse sequence 606 represents activation of the transfer station 110 by the controller 115 The repeating dual sawtooth pulse sequence 608 represents target substrate 118 demand at the transfer station 110

The intermediate substrate 104 begins moving in the process direction 120 at the beginning of a print job in order to begin imaging the first page Each cycle of the sawtooth waveform ("P") 610 represents a revolution or pass of the intermediate substrate 104. The diagram reflects twelve passes (12P), numbered sequentially P1–P12 In actuality, the intermediate substrate 104 continues to move until the print job is complete. A pass (P) is a useful reference for timing operations and will be used in the following discussion for relative and proportional comparisons (e.g, 0.5P, 5.5P)

Returning to FIGS. 1 and 2, the two-pitch, six-pass marking architecture is based on requiring six passes of the marking material applicator 102 over each of the pitch areas 218 to completely mark the composite image. The six passes can either apply six swaths or six color separations of the composite image Where it is based on six swaths, the desired composite resolution and the resolution of each swath of the applicator 102 are considered For example, if the desired resolution is 600 dots per inch (dpi), in the six-pass architecture the resolution of the marking material applicator 102 is 100 dpi. After each pass, the applicator 102 is moved in the X (i.e., cross-process) direction by the controller 115 and the resolution of the composite image is 600 dpi from the accumulation of the six 100 dpi swaths Alternatively, where the six passes apply six color separations, each color separation is applied in successive passes. For example, the applicator 102 may deposit cyan, magenta, yellow, red, green, and blue color separations in successive passes. Other techniques that complete the composite image in six passes are also contemplated, including print systems with multiple marking material applicators 102.

With continued reference to FIG. 6, each pulse 612 in the square pulse train 604 represents activation of the marking material applicator 102 by the controller 115 In the two-pitch, six-pass marking architecture, the applicator 102 is activated twice during each pass P of the intermediate substrate 104; one activation for each pitch area 218. For clarity, the two pitch areas 218 on the intermediate substrate 104 are referred to as "pitch A" and "pitch B" in the following discussion. Furthermore, it is assumed that the applicator 102 encounters pitch A and then pitch B during each pass P. In other words, pitch A represents the first page and subsequent odd pages of a print job and pitch B represents the second page and subsequent even pages In "burst mode," the applicator 102 begins depositing marking material on both pitch A and pitch B during pass P1. This is reflected by applicator activation pulses A1 614 and B1 616. As first and second page imaging continues, pulses A2 618 and B2 620 represent activation of the applicator 102 during pass P2 Likewise, pulses A3 622 and B3 624 represent activation during pass P3, pulses A4 626 and B4 628 represent activation during pass P4, pulses A5 630 and B5 632 represent activation during pass P5, and pulses A6 634 and B6 636 represent activation during pass P6 After the sixth pass, the applicator 102 begins another identical six-pass cycle for the third and fourth pages of the print job. The applicator 102 continues to be activated in like fashion until the print job is complete Each pulse (e.g., 638) in the dual square pulse sequence 606 represents activation of the transfer station 110 by the controller 115 After the start of A6 634, transfer of the pitch A composite image to a target substrate 118 can begin. Accordingly, a target substrate sheet 118 advancing along the paper path 116 is coordinated to meet with the composite image as it reaches the transfer station 110 Transfer of the composite image is performed during transfer station activation pulse TA1 638 Note that the duration of pulse TA1 638 is the substantially the same as an applicator activation pulse 612 because the target substrate 118 and the surface of the intermediate substrate 104 are moving at substantially the same speed during the transfer operation. Also note, that in actuality the transfer station activation pulse TA1 638 lags the sixth applicator activation pulse A6. The amount of lag depends on the actual positions of the applicator 102 and the transfer station 110. For example, in the print system 100 of FIG. 1 the applicator 104 is shown at 2 o'clock and the transfer station 110 at 6 o'clock with respect to the intermediate substrate 104. This would result in an approximate delay of 0.67P from pulse A6 634 to pulse TA1 638. Each transfer station activation pulse would lag its corresponding sixth applicator application pulse in like fashion Nevertheless, the present invention is not effected by the delay.

Likewise, after the start of B6 636, transfer of the pitch B composite image to a target substrate 118 can begin. Accordingly, a second target substrate sheet 118 advancing along the paper path 116 is coordinated to meet the composite image as it reaches the transfer station 110. Transfer of the composite image is performed during the transfer station activation pulse TB1 640. Presuming the print job includes third and fourth pages, the transfer station is activated again in identical fashion after the start of A6 634 and B6 636 in pass P12. Transfer station activation for the third and fourth page images are represented by pulses TA2 642 and TB2 644, respectively Each pulse (eg, 646) in the dual sawtooth pulse sequence 608 represents target substrate 118 demand at the transfer station 110. In "burst mode," it is important to note that the second target substrate sheet 118 is demanded approximately 0.5P revolutions of the intermediate substrate 104 after the first target substrate sheet 118 was demanded. This is reflected by sawtooth pulses 646 and 648, which align with the beginning of transfer station activation pulses TA1 638 and TB1 640, respectively In contrast, the third target substrate sheet 118 is demanded approximately 5.5P revolutions after the second target substrate sheet 118. This is reflected by sawtooth pulses 648 and 650, which align with the beginning of transfer station activation pulses TB1 640 and TA 2 642, respectively. This pattern of odd numbered sheets demanded approximately 0.5P revolutions after even numbered sheets and even number sheets demanded approximately 5.5P revolutions after odd numbered sheets continues until the print job is complete The disparity between alternating demands of 0.5P and 5.5P revolutions of the intermediate substrate 104 is perhaps emphasized by the following example If the intermediate substrate is a drum with a circumference of 565.5 mm (22.25 in.) and the drum is rotated at 1400 mm/sec. (55 in./sec.), each pass (P) is 0.4 sec. in duration and the transfer station 110 alternates between demanding target substrate sheets 118 in 0.2 sec (0.5P) and 2.2 sec (5.5P).

Figure 7:
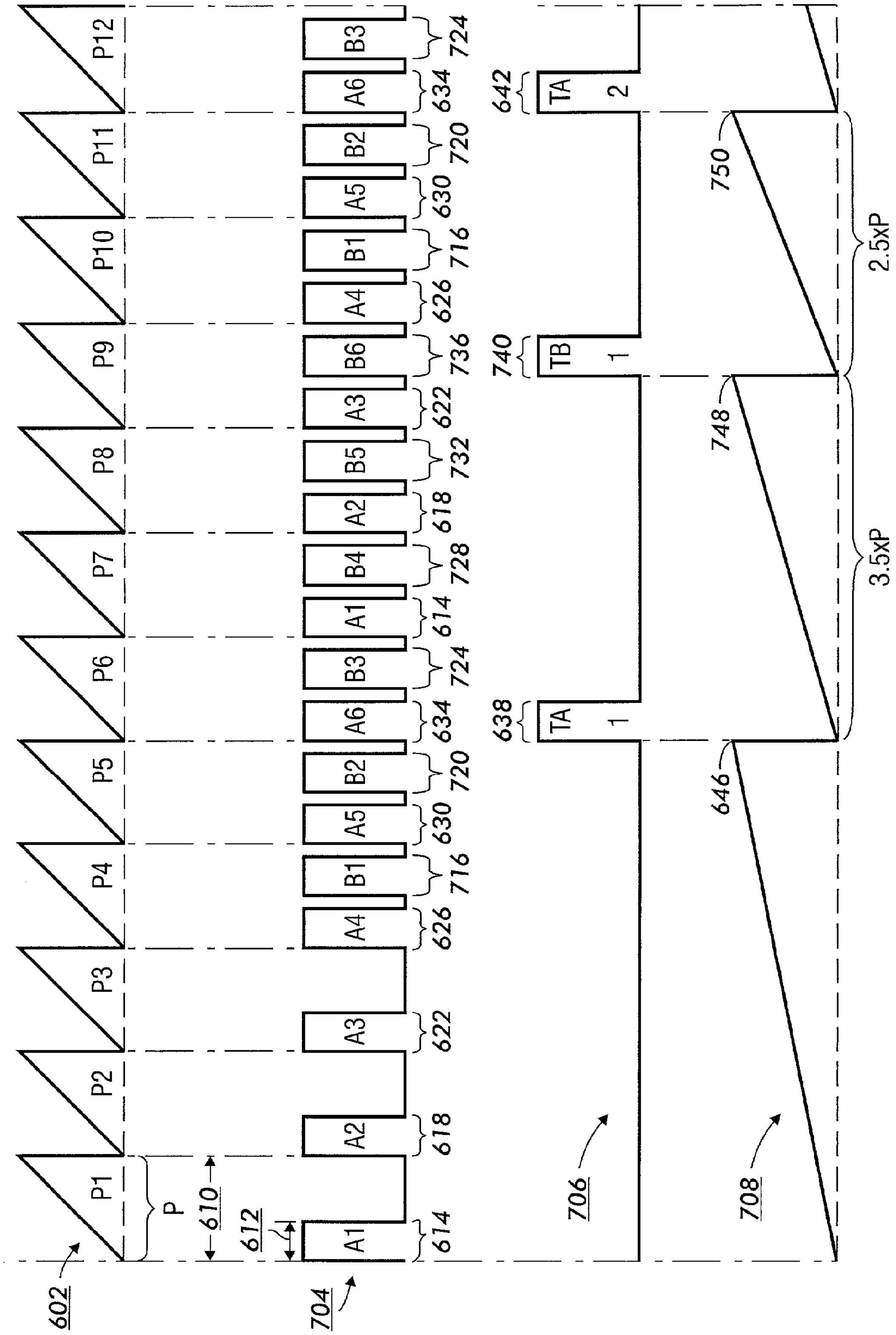
FIG. 7 is a timing diagram for a two-pitch, six-pass marking architecture that schedules print jobs in an "alternate imaging mode" in accordance with an embodiment of the present invention.

With reference to FIG. 7, a timing diagram for a two-pitch, six-pass marking architecture that schedules print jobs in an "alternate imaging mode" in accordance with an embodiment of the present invention is shown Like FIG. 6, FIG. 7 includes a periodic sawtooth waveform 602, a square pulse train 704, a repeating dual square pulse sequence 706, and a repeating dual sawtooth pulse sequence 708 The diagrams (ie, 602, 704, 706, and 708) represent the same type of information as the diagrams of FIG. 6

The intermediate substrate 104 moves in the same manner for FIG. 7 as described for FIG. 6. Accordingly, the periodic sawtooth waveform 602 and a pass P 610 of the intermediate substrate 104 in FIG. 7 are identical to that of FIG. 6

Like in FIG. 6, each pulse 612 in the square pulse train 704 of FIG. 7 represents activation of the marking material applicator 102 by the controller 115 Since FIG. 7, like FIG. 6, shows timing sequences for a two-pitch, six-pass marking architecture, the marking material applicator 102 is activated in basically the same manner as described in FIG. 6. Accordingly, FIG. 7 also refers to the two pitch areas 218 on the intermediate substrate 104 as "pitch A" and "pitch B" The distinction between FIG. 7 and FIG. 6 is that FIG. 7 employs "alternate imaging mode" rather than "burst mode" scheduling In this embodiment of "alternate imaging mode," the applicator 102 begins depositing marking material on pitch A during pass P1 and delays beginning pitch B imaging until pass P4. This is reflected by applicator activation pulses A1 614 during pass P1. During passes P2 and P3, first page imaging continues with pulses A2 618 and A3 622, respectively During pass P4, first page imaging continues and the applicator 102 begins depositing marking material on pitch B This is reflected by pulses A4 626 and B1 716 During pass P5, first page and second page imaging continues with pulses A5 630 and B2 720. During pass P6, first page and second page imaging continues with pulses A6 634 and B3 724. During pass P7, second page imaging continues on pitch B and the applicator 102 begins another identical six-pass cycle for the third page of the print job on pitch A This is reflected by pulses B4 728 and A1 614. During pass P8, second and third page imaging continues with pulses B5 732 and A2 618 During pass P9, second and third page imaging continues with pulses B6 736 and A3 622 The applicator 102 continues to be activated in like fashion until the print job is complete Like in FIG. 6, each pulse (e.g., 638) in the dual square pulse sequence 706 of FIG. 7 represents activation of the transfer station 110 by the controller 115. After the start of A6 634, transfer of the pitch A composite image to a target substrate 118 can begin. Transfer of the pitch A composite image is performed the same in FIG. 7 as in FIG. 6 This is reflected by transfer station activation pulse TA1 638, which occurs at the same point in FIG. 7 as in FIG. 6 Transfer of the pitch B composite image to a target substrate 118 can begin after the start of B6 736 This is reflected by transfer station activation pulse TB1 740. However, note that in FIG. 7 the applicator activation pulse B6 begins during pass P9, rather than during pass P6 as it did in FIG. 6. Presuming the print job includes third and fourth pages, the transfer station is activated again in identical fashion after the start of A6 634 in pass P12 and after the start of the sixth marking pass over pitch B in pass P15 (not shown). Transfer station activation for the third page image is represented by pulse TA2 642.

Like in FIG. 6, each pulse (e.g., 646) in the dual sawtooth pulse sequence 708 in FIG. 7 represents target substrate 118 demand at the transfer station 110 In this embodiment of "alternate imaging mode," it is important to note that the second target substrate sheet 118 is demanded approximately 3.5P revolutions of the intermediate substrate 104 after the first target substrate sheet 118 was demanded. This is reflected by sawtooth pulses 646 and 748, which align with the beginning of transfer station activation pulses TA1 638 and TB1 740, respectively. Similarly, the third target substrate sheet 118 is demanded approximately 2.5P revolutions after the second target substrate sheet 118. This is reflected by sawtooth pulses 748 and 750, which align with the beginning of transfer station activation pulses TB1 740 and TA2 642, respectively. This pattern of odd numbered sheets demanded approximately 3.5P revolutions after even numbered sheets and even number sheets demanded approximately 2.5P revolutions after odd numbered sheets continues until the print job is complete.

Where average demand would be 3P revolutions of the intermediate substrate 104, the alternating demands of 3.5P and 2.5P revolutions in FIG. 7 produces less deviation about the average than the alternating demands of 0.5P and 5.5P in FIG. 6 This is perhaps emphasized by applying the example of the drum with a circumference of 565.5 mm (22.25 in.), rotated at 1400 mm/sec (55 in/sec) used above. Recall that each pass (P) of the drum is 0.4 sec. in duration. Also recall that under "burst mode" scheduling (FIG. 6) the transfer station 110 alternates between demanding target substrate sheets 118 in 0.2 sec. (0.5P) and 2.2 sec. (5.5P). Here, under the FIG. 7 embodiment of "alternate imaging mode" scheduling, the transfer station 110 alternates between demanding target substrate sheets 118 in 1.4 sec (3.5P) and 1.0 sec. (2.5P)

Figure 8:
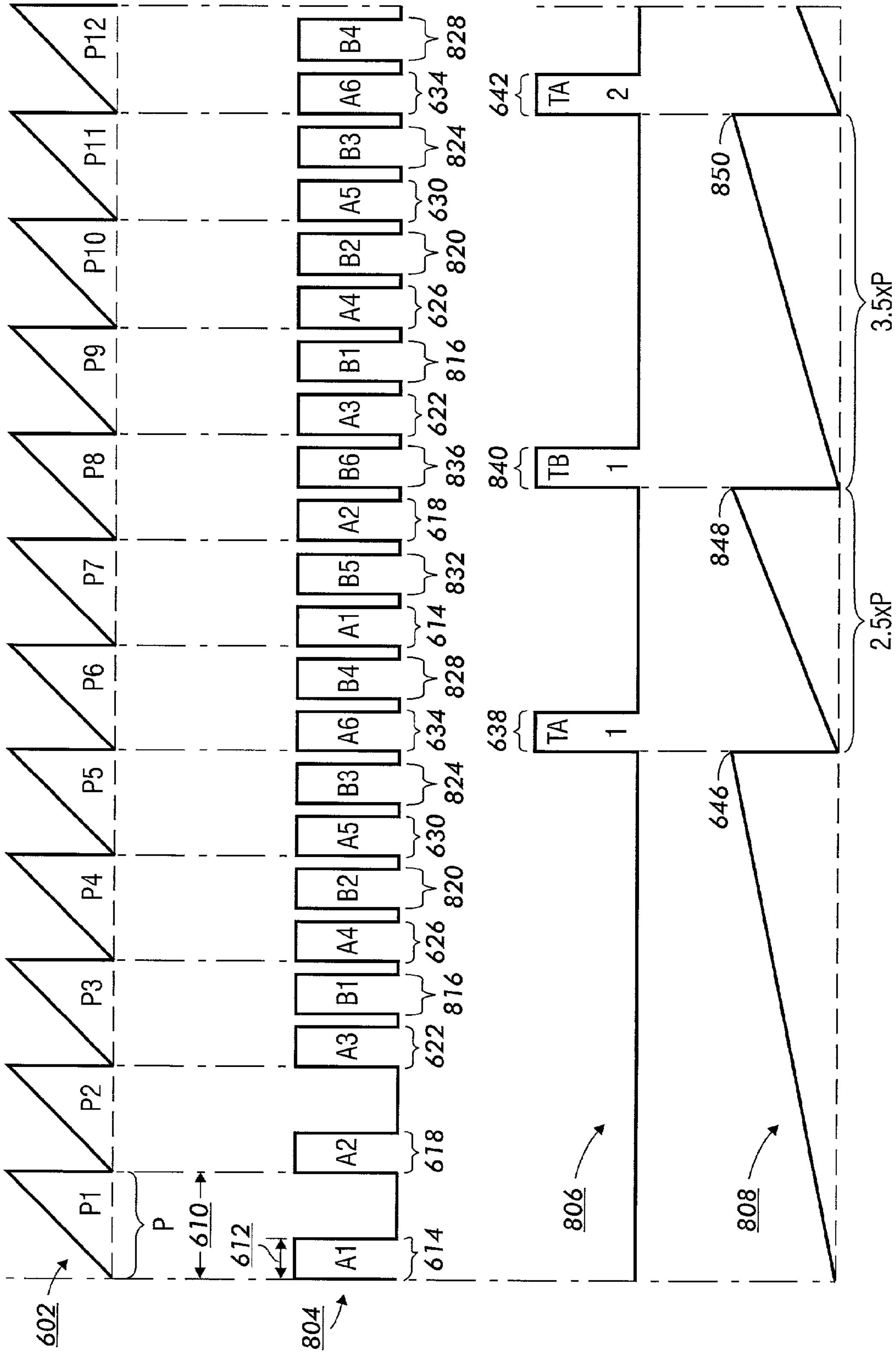
FIG. 8 is a timing diagram for a two-pitch, six-pass marking architecture that schedules print jobs in an "alternate imaging mode" in accordance with an embodiment of the present invention.

With reference to FIG. 8, a timing diagram for a two-pitch, six-pass marking architecture that schedules print jobs in an "alternate imaging mode" in accordance with an embodiment of the present invention is shown. Like FIG. 6, FIG. 8 includes a periodic sawtooth waveform 602, a square pulse train 804, a repeating dual square pulse sequence 806, and a repeating dual sawtooth pulse sequence 808 The diagrams (i.e., 602, 804, 806, and 808) represent the same type of information as the diagrams of FIG. 6.

The intermediate substrate 104 moves in the same manner for FIG. 8 as described for FIG. 6. Accordingly, the periodic sawtooth waveform 602 and a pass P 610 of the intermediate substrate 104 in FIG. 8 are identical to that of FIG. 6

Like in FIG. 6, each pulse 612 in the square pulse train 804 of FIG. 8 represents activation of the marking material applicator 102 by the controller 115 Since FIG. 8, like FIG. 6, shows timing sequences for a two-pitch, six-pass marking architecture, the marking material applicator 102 is activated in basically the same manner as described in FIG. 6. Accordingly, FIG. 8 also refers to the two pitch areas 218 on the intermediate substrate 104 as "pitch A" and "pitch B" The distinction between FIG. 8 and FIG. 6 is that FIG. 8 employs "alternate imaging mode" rather than "burst mode" scheduling.

In this embodiment of "alternate imaging mode," the applicator 102 begins depositing marking material on pitch A during pass P1 and delays beginning pitch B imaging until pass P3. This is reflected by applicator activation pulses A1 614 during pass P1. During pass P2, first page imaging continues with pulse A2 618 During pass P3, first page imaging continues and the applicator 102 begins depositing marking material on pitch B This is reflected by pulses A3 626 and B1 816 During pass P4, first page and second page imaging continues with pulses A4 626 and B2 820 During pass P5, first page and second page imaging continues with pulses A5 630 and B3 824 During pass P6, first page and second page imaging continues with pulses A6 634 and B4 828 During pass P7, second page imaging continues on pitch B and the applicator 102 begins another identical six-pass cycle for the third page of the print job on pitch A This is reflected by pulses B5 832 and A1 614 During pass P8, second and third page imaging continues with pulses B6 836 and A2 618 The applicator 102 continues to be activated in like fashion until the print job is complete.

Like in FIG. 6, each pulse (e.g., 638) in the dual square pulse sequence 806 of FIG. 8 represents activation of the transfer station 110 by the controller 115. After the start of A6 634, transfer of the pitch A composite image to a target substrate 118 can begin Transfer of the pitch A composite image is performed the same in FIG. 8 as in FIG. 6. This is reflected by transfer station activation pulse TA1 638, which occurs at the same point in FIG. 8 as in FIG. 6. Transfer of the pitch B composite image to a target substrate 118 can begin after the start of B6 836 This is reflected by transfer station activation pulse TB1 840. However, note that in FIG. 8 the applicator activation pulse B6 begins during pass P8, rather than during pass P6 as it did in FIG. 6. Presuming the print job includes third and fourth pages, the transfer station is activated again in identical fashion after the start of A6 634 in pass P12 and after the start of the sixth marking pass over pitch B in pass P14 (not shown). Transfer station activation for the third page image is represented by pulse TA2 642.

Like in FIG. 6, each pulse (e.g., 646) in the dual sawtooth pulse sequence 808 in FIG. 8 represents target substrate 118 demand at the transfer station 110 In this embodiment of "alternate imaging mode," it is important to note that the second target substrate sheet 118 is demanded approximately 2.5P revolutions of the intermediate substrate 104 after the first target substrate sheet 118 was demanded This is reflected by sawtooth pulses 646 and 848, which align with the beginning of transfer station activation pulses TA1 638 and TB1 840, respectively. Similarly, the third target substrate sheet 118 is demanded approximately 3.5P revolutions after the second target substrate sheet 118. This is reflected by sawtooth pulses 848 and 850, which align with the beginning of transfer station activation pulses TB1 840 and TA2 642, respectively This pattern of odd numbered sheets demanded approximately 2.5P revolutions after even numbered sheets and even number sheets demanded approximately 3.5P revolutions after odd numbered sheets continues until the print job is complete.

Where average demand would be 3P revolutions of the intermediate substrate 104, the alternating demands of 2.5P and 3.5P revolutions in FIG. 8 produces less deviation about the average than the alternating demands of 0.5P and 5.5P in FIG. 6 This is perhaps emphasized by applying the example of the drum with a circumference of 565.5 mm (22.25 in.), rotated at 1400 mm/sec (55 in./sec.) used above Recall that each pass (P) of the drum is 0.4 sec. in duration. Also recall that under "burst mode" scheduling (FIG. 6) the transfer station 110 alternates between demanding target substrate sheets 118 in 0.2 sec (0.5P) and 2.2 sec (5.5P) Here, under the FIG. 8 embodiment of "alternate imaging mode" scheduling, the transfer station 110 alternates between demanding target substrate sheets 118 in 1.0 sec. (2.5P) and 1.4 sec (3.5P)

The invention has been described with reference to the preferred embodiments. Obviously, modifications and alterations will occur to others upon reading and understanding the preceding detailed description It is intended that the invention be construed as including all such modifications and alterations insofar as they come within the scope of the appended claims or the equivalents thereof

What is claimed is:

1. A method for scheduling print operations in a print system, comprising the steps of:

a) partitioning an intermediate substrate into multiple pitch areas;

b) scheduling the marking of multiple page images by a marking material applicator on the multiple pitch areas, the marking of each page image being accumulated and completed during multiple passes of an assigned pitch area past the applicator;

c) beginning the marking of a first page image in a first pitch area of the multiple pitch areas during a first revolution of the intermediate substrate; and d) beginning the marking of subsequent page images on available pitch areas of the multiple pitch areas during subsequent revolutions of the intermediate substrate, such marking being delayed from the marking of the prior page image so that the marking of two or more page images are not completed during the same revolution of said intermediate substrate.

2. The method for scheduling print operations as set forth in claim 1, wherein step a) partitions the intermediate substrate into two pitch areas identified as the first pitch area and a second pitch area.

3. The method for scheduling print operations as set forth in claim 2, wherein the marking of each page image is accumulated and completed during four passes.

4. The method for scheduling print operations as set forth in claim 1, step d) further comprising the steps of:

e) continuing to mark the first page image in the first pitch area during a second revolution of the intermediate substrate;

f) if there are no additional page images to be marked, continuing to mark the first page image in the first pitch area during a third revolution and a fourth revolution of the intermediate substrate, otherwise continuing to mark the first page image in the first pitch area and beginning the marking of a second page image in the second pitch area during a third revolution of the intermediate substrate;

g) continuing to mark the first page image in the first pitch area and the second page image in the second pitch area during a fourth revolution of the intermediate substrate; and, h) continuing to mark the second page image in the second pitch area during a fifth revolution and a sixth revolution of the intermediate substrate.

5. The method for scheduling print operations as set forth in claim 4, wherein at least one additional page image is to be marked on the intermediate substrate, wherein:

the marking of the next page image begins in the first pitch area of the intermediate substrate during the fifth revolution of the intermediate substrate with marking continuing during three subsequent passes of the first pitch area past the marking material applicator in the same manner as the marking of the first page image; and, if additional page images are to be marked on the intermediate substrate, the marking of each additional page image begins two revolutions after the revolution in which the previous page image marking began, wherein the marking of consecutive page images continues to alternate between the first pitch area and the second pitch area in the same manner as described for the first and second page images.

6. The method for scheduling print operations as set forth in claim 1, step d) further comprising the steps of:

e) if there are no additional page images to be marked, continuing to mark the first page image in the first pitch area during a second, a third, and a fourth revolution of the intermediate substrate, otherwise continuing to mark the first page image in the first pitch area and beginning the marking of a second page image in the second pitch area during a third revolution of the intermediate substrate;

f) continuing to mark the first page image in the first pitch area and the second page image in the second pitch area during the third and fourth revolutions of the intermediate substrate; and, g) continuing to mark the second page image in the second pitch area during the fifth revolution of the intermediate substrate.

7. The method for scheduling print operations as set forth in claim 6, wherein at least one additional page image is to be marked on the intermediate substrate, wherein:

the marking of the next page image begins in the first pitch area of the intermediate substrate during the fifth revolution of the intermediate substrate with marking continuing during three subsequent passes of the first pitch area past the marking material applicator in the same manner as the marking of the first page image; and, if additional page images are to be marked on the intermediate substrate, the beginning of marking of additional page images continues to alternate between one revolution after the revolution in which the previous page image marking began and three revolutions after the revolution in which the previous page image marking began in the same manner as described for the first, second, and third page images, wherein the marking of consecutive page images also continues to alternate between the first pitch area and the second pitch area in the same manner as described for the first and second page images.

8. The method for scheduling print operations as set forth in claim 2, wherein the marking of each page image is accumulated and completed during six passes.

9. The method for scheduling print operations as set forth in claim 1, step d) further comprising the steps of:

e) continuing to mark the first page image in the first pitch area during a second revolution and a third revolution of the intermediate substrate;

f) if there are no additional page images to be marked, continuing to mark the first page image in the first pitch area during a fourth revolution, a fifth revolution, and a sixth revolution of the intermediate substrate, otherwise continuing to mark the first page image in the first pitch area and beginning the marking of a second page image in the second pitch area during a fourth revolution of the intermediate substrate;

g) continuing to mark the first page image in the first pitch area and the second page image in the second pitch area during a fifth revolution and a sixth revolution of the intermediate substrate; and, h) continuing to mark the second page image in the second pitch area during a seventh revolution, an eighth revolution, and a ninth revolution of the intermediate substrate.

10. The method for scheduling print operations as set forth in claim 9, wherein at least one additional page image is to be marked on the intermediate substrate, wherein:

the marking of the next page image begins in the first pitch area of the intermediate substrate during the seventh revolution of the intermediate substrate with marking continuing during five subsequent passes of the first pitch area past the marking material applicator in the same manner as the marking of the first page image; and, if additional page images are to be marked on the intermediate substrate, the marking of each additional page image begins three revolutions after the revolution in which the previous page image marking began, wherein the marking of consecutive page images continues to alternate between the first pitch area and the second pitch area in the same manner as described for the first and second page images.

11. The method for scheduling print operations as set forth in claim 1, step d) further comprising the steps of:

e) continuing to mark the first page image in the first pitch area during a second revolution of the intermediate substrate;

f) if there are no additional page images to be marked, continuing to mark the first page image in the first pitch area during a third, a fourth, a fifth, and a sixth revolution of the intermediate substrate, otherwise continuing to mark the first page image in the first pitch area and beginning the marking of a second page image in the second pitch area during a third revolution of the intermediate substrate;

g) continuing to mark the first page image in the first pitch area and the second page image in the second pitch area during a fourth, a fifth, and a sixth, revolution of the intermediate substrate; and, h) continuing to mark the second page image in the second pitch area during a seventh revolution and an eighth revolution of the intermediate substrate.

12. The method for scheduling print operations as set forth in claim 11, wherein at least one additional page image is to be marked on the intermediate substrate, wherein:

the marking of the next page image begins in the first pitch area of the intermediate substrate during the seventh revolution of the intermediate substrate with marking continuing during five subsequent passes of the first pitch area past the marking material applicator in the same manner as the marking of the first page image; and, if additional page images are to be marked on the intermediate substrate, the beginning of marking of additional page images continues to alternate between two revolutions after the revolution in which the previous page image marking began and four revolutions after the revolution in which the previous page image marking began in the same manner as described for the first, second, and third page images, wherein the marking of consecutive page images also continues to alternate between the first pitch area and the second pitch area in the same manner as described for the first and second page images.

13. A method for scheduling multipass, multipitch print operations in a print system, comprising the steps of:

a) beginning the marking of a first page image by a marking material applicator on a first pitch area of an intermediate substrate during a first revolution of the intermediate substrate; and, b) beginning the marking of subsequent page images by the applicator on available pitch areas of the intermediate substrate during subsequent revolutions of the intermediate substrate, such marking being delayed from the marking of the prior page image so that the marking of two or more page images are not completed during the same revolution of the intermediate substrate.

14. A print system for processing print jobs, comprising:

an intermediate substrate for receiving marking materials, being selectively partitionable into multiple pitch areas;

a marking material applicator disposed to selectively apply marking material to the pitch areas on the intermediate substrate; and, a controller operationally coupled to said intermediate substrate and said applicator for controlling said intermediate substrate and for scheduling the application of marking material by said applicator, wherein the controlling includes partitioning the intermediate substrate into multiple pitch areas and wherein the scheduling includes: a) scheduling the marking of multiple page images by said applicator on the multiple pitch areas, the marking of each page image being accumulated and completed during multiple passes of an assigned pitch area past said applicator, b) beginning the marking of a first page image on a first pitch area during a first revolution of said intermediate substrate, and c) beginning the marking of subsequent page images on available pitch areas of the intermediate substrate during subsequent revolutions of the intermediate substrate, such marking being delayed from the marking of the prior page image so that the marking of two or more page images are not completed during the same revolution of said intermediate substrate.

15. The print system set forth in claim 14, wherein said intermediate-substrate is selected from the group consisting of a rotating drum and a moving belt.

16. The print system set forth in claim 14, wherein said print system is an ink-jet print system and said marking material applicator is an ink-jet print head.

17. The print system set forth in claim 16, wherein said print head is a piezoelectric print head using a solid ink supply to mark said intermediate substrate.

18. The print system set forth in claim 16, wherein said print head marks a one quarter resolution swath of the page image in an assigned pitch area of said intermediate substrate during each of four consecutive passes of said intermediate substrate past said print head, accumulating and completing the page image in the four passes and wherein the controller moves the print head in cross-process direction after each pass to position the print head for the next pass.

19. The print system set forth in claim 16, wherein said print head marks a one sixth resolution swath of the page image in an assigned pitch area of said intermediate substrate during each of six consecutive passes of said intermediate substrate past said print head, accumulating and completing the page image in the six passes and wherein the controller moves the print head in cross-process direction after each pass to position the print head for the next pass.

20. The print system set forth in claim 14, wherein said print system is a xerographic print system, wherein said marking material applicator includes a developer station using a toner mixture to mark said intermediate substrate.

* * * * *